United States Patent
Lee et al.

(10) Patent No.: US 8,897,723 B2
(45) Date of Patent: Nov. 25, 2014

(54) SYSTEM AND METHOD FOR MODULATING DATA ADAPTIVELY USING SELECTION OF MULTI ANTENNA

(75) Inventors: Woo Yong Lee, Daejeon (KR); Kyeongpyo Kim, Daejeon (KR); Jin Kyeong Kim, Daejeon (KR); Yong Sun Kim, Daejeon (KR); Hyoung Jin Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 808 days.

(21) Appl. No.: 12/672,738

(22) PCT Filed: Aug. 8, 2008

(86) PCT No.: PCT/KR2008/004616
§ 371 (c)(1),
(2), (4) Date: Feb. 9, 2010

(87) PCT Pub. No.: WO2009/022818
PCT Pub. Date: Feb. 19, 2009

(65) Prior Publication Data
US 2011/0028106 A1    Feb. 3, 2011

(30) Foreign Application Priority Data

Aug. 10, 2007  (KR) .................. 10-2007-0080896
Nov. 16, 2007  (KR) .................. 10-2007-0117120
Aug. 1, 2008   (KR) .................. 10-2008-0075790

(51) Int. Cl.
| H03C 7/02 | (2006.01) |
| H04B 7/02 | (2006.01) |
| H04B 1/02 | (2006.01) |
| H04M 1/00 | (2006.01) |
| H04L 1/06 | (2006.01) |
| H04L 1/00 | (2006.01) |
| H04B 7/06 | (2006.01) |
| H04B 7/08 | (2006.01) |

(52) U.S. Cl.
CPC *H04B 7/061* (2013.01); *H04L 1/06* (2013.01); *H04L 1/0001* (2013.01); *H04L 1/0003* (2013.01); *H04B 7/0805* (2013.01)
USPC .................... 455/91; 455/101; 455/562.1

(58) Field of Classification Search
CPC ...... H04B 7/06; H04B 7/0602; H04B 7/0604; H04B 7/061; H04B 7/0865; H04B 7/0643; H04B 7/0647; H04L 1/0002; H04L 1/0004
USPC ............. 455/68–69, 101, 511, 561–562.1; 370/310

See application file for complete search history.

(56) References Cited

U.S. PATENT DOCUMENTS 5,689,439 A * 11/1997 Weerackody et al. ........ 370/329
7,706,462 B2 *  4/2010 Abe .............................. 375/267

(Continued)

FOREIGN PATENT DOCUMENTS

KR    1020020031694 A    5/2002
KR    1020020076991 A    10/2002

(Continued)

OTHER PUBLICATIONS

International Search Report: PCT/KR2008/004616.

*Primary Examiner* — Simon Nguyen
(74) *Attorney, Agent, or Firm* — Ladas & Parry LLP

(57) ABSTRACT

An adaptive modulation apparatus and method using a multiple antenna selection scheme are provided. The adaptive modulation method using the multiple antenna scheme includes: selecting one transmit antenna from a plurality of transmit antennas; determining a target transmission rate of the selected transmit antenna to transmit the determined target transmission rate to a multiple antenna reception apparatus; receiving, from the multiple antenna reception apparatus, feedback information including information regarding whether to accept the target transmission rate; and transmitting data to the multiple antenna reception apparatus using the received feedback information.

5 Claims, 14 Drawing Sheets

(56) References Cited

U.S. PATENT DOCUMENTS

| | | | |
|---|---|---|---|
| 7,751,493 B2 * | 7/2010 | Niu et al. | 375/267 |
| 7,773,687 B2 * | 8/2010 | Yoshida | 375/285 |
| 7,889,130 B2 * | 2/2011 | Murakami et al. | 342/377 |
| 7,899,497 B2 * | 3/2011 | Kish et al. | 455/562.1 |
| 7,991,068 B2 * | 8/2011 | Ionescu et al. | 375/267 |
| 8,059,607 B1 * | 11/2011 | Shaw et al. | 370/334 |
| 2004/0196919 A1 * | 10/2004 | Mehta et al. | 375/267 |
| 2005/0075073 A1 * | 4/2005 | Kadous et al. | 455/63.1 |
| 2005/0195744 A1 * | 9/2005 | Ryan et al. | 370/235 |
| 2005/0220211 A1 * | 10/2005 | Shim et al. | 375/267 |
| 2005/0250544 A1 * | 11/2005 | Grant et al. | 455/562.1 |
| 2006/0270360 A1 * | 11/2006 | Han et al. | 455/69 |
| 2006/0276217 A1 * | 12/2006 | Khojastepour et al. | 455/522 |
| 2007/0147251 A1 * | 6/2007 | Monsen | 370/235 |
| 2008/0026797 A1 * | 1/2008 | Nanda et al. | 455/562.1 |
| 2008/0064353 A1 * | 3/2008 | McBeath et al. | 455/187.1 |
| 2008/0317014 A1 * | 12/2008 | Veselinovic et al. | 370/380 |
| 2009/0006920 A1 * | 1/2009 | Munson et al. | 714/748 |
| 2009/0022066 A1 * | 1/2009 | Kish et al. | 370/253 |
| 2010/0041355 A1 * | 2/2010 | Laroia et al. | 455/129 |
| 2012/0039377 A1 * | 2/2012 | Sun et al. | 375/224 |

FOREIGN PATENT DOCUMENTS

| | | |
|---|---|---|
| WO | 2004/039011 A2 | 5/2004 |
| WO | 2006/020434 A2 | 2/2006 |

\* cited by examiner

FIG. 8

| Name | Type | Valid range | Description |
|---|---|---|---|
| TrgtID | Integer | Any valid DEVID value as defined in IEEE 802.15.3 | Specifies DEVID of target DEV for exchanging Transmit Switched Diversity information |
| OrigID | Integer | Any valid DEVID value as defined in IEEE 802.15.3 | Indicates DEVID of DEV that initiated MLME request |
| SupportedAntennaNumber | Integer | 0-15 | indicates number of antennas applying Transmit Switched Diversity scheme |
| Timeout | Integer | 0-65535 | Indicates time in milliseconds allowed for transferring primitive |
| TxDiversityTheshold | Integer | 0-255 | 0-255 Specifies antenna selection threshold |
| AntennaSwitching Status | Enumeration | NOT_SWITCH, RESERVED, SWITCH, BEST_SWITCH | Indicates antenna switching status |
| AntennaIndex | | 0-15 | Specifies antenna index transmitted |
| Resurt Code | | SUCCESS, FAILURE | Indicates result of the MLME request |
| ReasonCode | | NOT_SUPPORT, OTHER | Indicates reason for ResultCode of FAILURE |

FIG. 10

Transmit switched diversity IE

| Element ID hex value | Element | Present in hex value |
|---|---|---|
| 0x15 | Transmit switched diversity | As needed |

FIG. 11

Format of transmit switched diversity IE

| bits : 7 | b6 | b5 | b4 | b3 | b2 | b1 | b0 |
|---|---|---|---|---|---|---|---|
| Reserved | | | | Number of transmit antennas | | | |
| Octet #1 | | | | | | | |

FIG. 12

MAC command frame

| Command type hex value b15-b0 | Command name | Associated | Secure Membership (if required) |
|---|---|---|---|
| 0x002A | Transmit switched diversity request | X | X |
| 0x002B | Transmit switched diversity request | X | X |

FIG. 13

Transmit switched diversity request command frame

| Octet : 1 | 2 | 3 |
|---|---|---|
| Switching status | Length = 1 | Command type |

FIG. 14

| Switching status field | | | | | | | |
|---|---|---|---|---|---|---|---|
| bits : 7 | b6 | b5 | b4 | b3 | b2 | b1 | b0 |
| Indication of antenna switching | | Reserved | | Transmit antenna index | | | |

FIG. 15

Indication of antenna switching

| bits : 7 | b6 | Indication of antenna switching |
|---|---|---|
| 0 | 0 | No switch |
| 0 | 1 | Reserved |
| 1 | 0 | Switch to another transmit antenna that is not used yet |
| 1 | 1 | Switch to antenna that is indicated by transmit antenna index field |

FIG. 16

Transmit switched diversity request command frame

| Octet : 1 | 2 | 3 |
|---|---|---|
| Switched antenna index | Length = 1 | Command type |

SYSTEM AND METHOD FOR MODULATING DATA ADAPTIVELY USING SELECTION OF MULTI ANTENNA

This work was supported by the IT R&D program of MIC/IITA. [2007-S-002-01, Development of Multi-Gigabit Air Interface]

TECHNICAL FIELD

The present invention relates to an adaptive modulation apparatus and method using a multiple antenna selection scheme, and more particularly, to an adaptive modulation apparatus and method using a multiple antenna selection scheme that can change a transmission rate according to a channel environment.

BACKGROUND ART

A multiple-input multiple-output (MIMO) technology is essential in application fields such as a wireless personal area network (WPAN) requiring a high data transmission rate. However, in the case of multiple antennas with multiple radio frequency (RF) chains, a chip is very expensive due to the multiple antennas and RF chains and high hardware complexity is also required.

Although this system can obtain optimal performance, it may be not appropriate in application fields such as WPAN. Accordingly, there is a need for a method and apparatus for adaptively modulating data using a multiple antenna selection scheme.

DISCLOSURE OF INVENTION

Technical Goals

An aspect of the present invention provides an adaptive modulation method and apparatus using a multiple antenna selection scheme that can employ an antenna selection function to thereby perform communication using a plurality of antennas without restriction on a number of radio frequency (RF) chains.

Another aspect of the present invention also provides an adaptive modulation method and apparatus using a multiple antenna selection scheme that can adaptively modulate data according to an antenna channel environment to perform communication and thereby can maximize frequency efficiency and minimize antenna selection latency.

Technical Solutions

According to an aspect of the present invention, there is provided an adaptive modulation apparatus using a multiple antenna selection scheme, the apparatus including: an antenna selector selecting one transmit antenna from a plurality of transmit antennas; a target transmission rate decision unit determining a target transmission rate of the selected transmit antenna; a transmitter transmitting the determined target transmission rate to a multiple antenna reception apparatus; and a receiver receiving, from the multiple antenna reception apparatus, feedback information including information regarding whether to accept the target transmission rate.

According to another aspect of the present invention, there is provided an adaptive modulation method using a multiple antenna selection scheme, the method including: selecting one transmit antenna from a plurality of transmit antennas; determining a target transmission rate of the selected transmit antenna to transmit the determined target transmission rate to a multiple antenna reception apparatus; receiving, from the multiple antenna reception apparatus, feedback information including information regarding whether to accept the target transmission rate; and transmitting data to the multiple antenna reception apparatus using the received feedback information.

Advantageous Effect

According to the present invention, there is provided an adaptive modulation method and apparatus using a multiple antenna selection scheme that can maximize frequency efficiency and minimize antenna selection latency through the selective usage of an antenna and the adaptive modulation according to a channel environment. Thus, it is possible to improve a data transmission rate.

BRIEF DESCRIPTION OF DRAWINGS

FIGS. 8 through 16 illustrate a transmit switched diversity of FIG. 7.

BEST MODE FOR CARRYING OUT THE INVENTION

Figure 1:
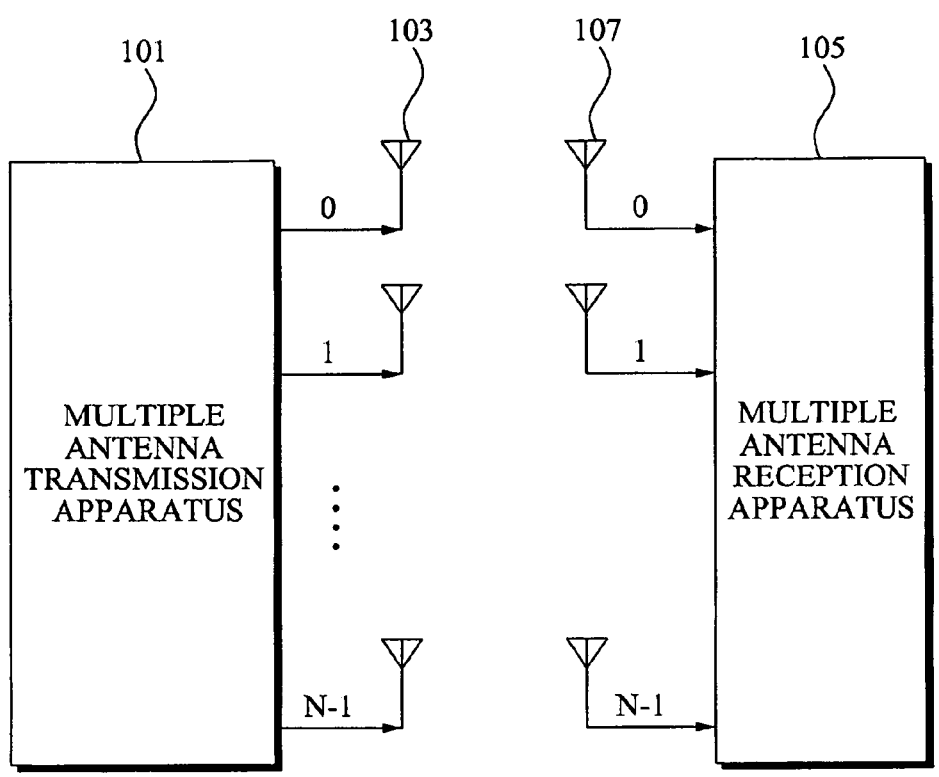
FIG. 1 is a diagram for describing an adaptive modulation apparatus using a multiple antenna selection scheme according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

An adaptive modulation method using a multiple antenna selection scheme according to an embodiment of the present invention is a communication apparatus that can effectively overcome communication faults using an antenna selection diversity and adaptive modulation in a wireless channel environment.

FIG. 1 is a diagram for describing an adaptive modulation apparatus using a multiple antenna selection scheme according to an embodiment of the present invention.

Referring to FIG. 1, the adaptive modulation scheme using the multiple antenna selection scheme includes a multiple antenna transmission apparatus 101 and a multiple antenna reception apparatus 105.

The multiple antenna transmission apparatus 101 may select one transmit antenna from a plurality of transmit antennas 103 and determine a target transmission rate of the selected transmit antenna. Also, the multiple antenna transmission apparatus 101 may transmit the determined target transmission rate to the multiple antenna reception apparatus 105 and receive, from the multiple antenna reception apparatus 105, feedback information including information regarding whether to accept the target transmission rate. The multiple antenna transmission apparatus 101 may transmit data to the multiple antenna reception apparatus 105 using the received feedback information.

When the multiple antenna transmission apparatus 101 receives the feedback information that includes at least one of an acceptance disallowing message of the target transmission rate and a transmit switched diversity request message, the multiple antenna transmission apparatus 101 may select another transmit antenna from the plurality of transmit antennas 103 and retransmit a target transmission rate of the selected other transmit antenna.

The multiple antenna reception apparatus 105 may select one receive antenna from a plurality of receive antennas 107, and receive a target transmission rate from the multiple antenna transmission apparatus 101 using the selected receive antenna to measure a channel status value of the receive antenna based on the received target transmission rate. Here, the channel status value may be a value of a received signal, a signal-to-noise ratio (SNR), and a log-likelihood ratio (LLR). Also, the multiple antenna reception apparatus 105 may compare the measured channel status value with a predetermined threshold to determine whether to accept the target transmission rate. Here, the predetermined threshold may be set for each stage in correspondence to the target transmission rate. The multiple antenna reception apparatus 105 may transmit, to the multiple antenna transmission apparatus 101, feedback information including information regarding whether to accept the target transmission rate. Here, the feedback information may further include the channel status value, the transmit switched diversity request message, and the like.

Figure 2:
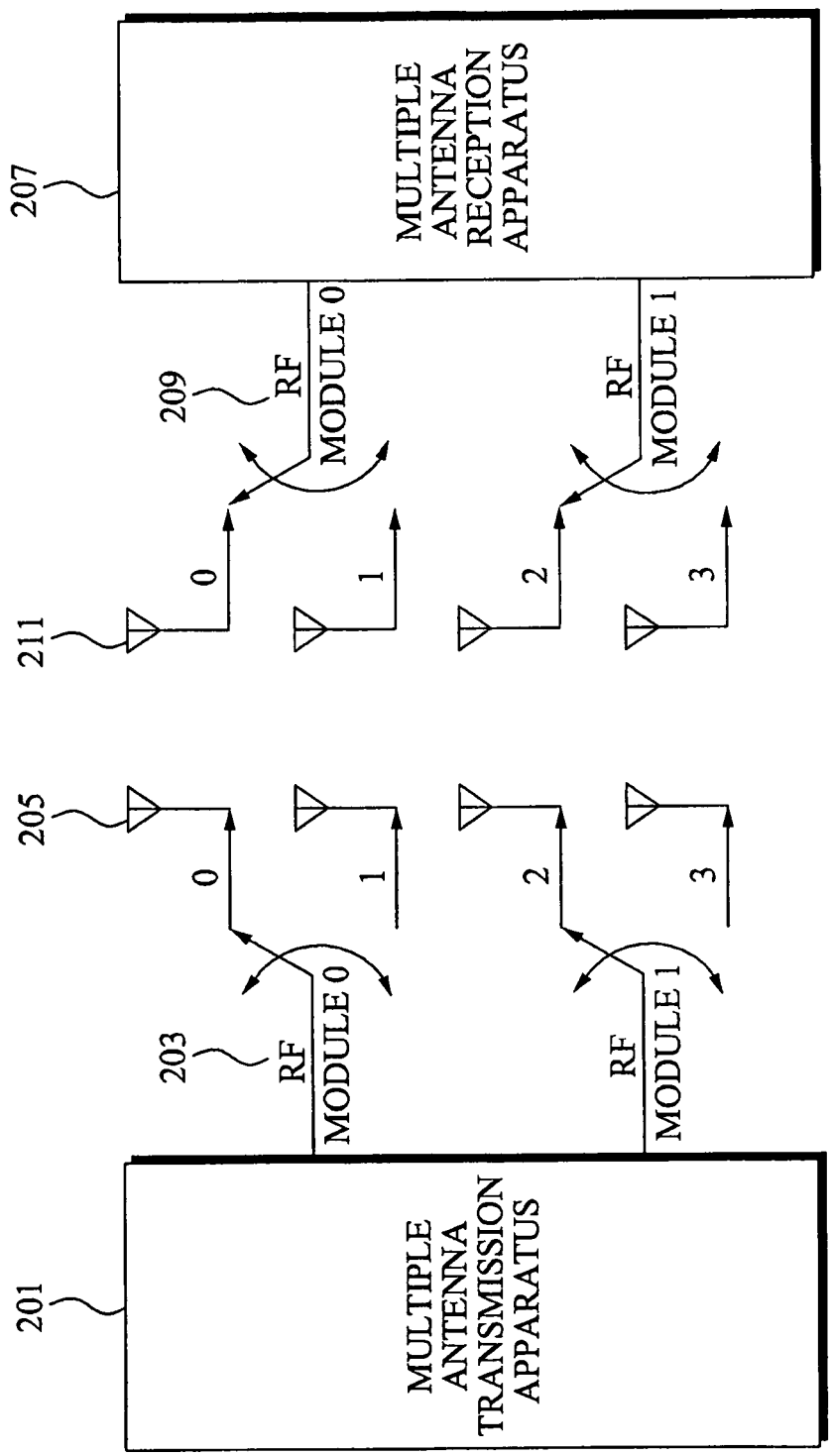
FIG. 2 illustrates an example of a plurality of radio frequency (RF) modules in an adaptive modulation apparatus using a multiple antenna selection scheme according to an embodiment of the present invention.

FIG. 2 illustrates an example of a plurality of radio frequency (RF) modules in an adaptive modulation apparatus using a multiple antenna selection scheme according to an embodiment of the present invention.

Referring to FIG. 2, the adaptive modulation apparatus using the multiple antenna selection scheme includes a multiple antenna transmission apparatus 201 and a multiple antenna reception apparatus 207.

The multiple antenna transmission apparatus 201 may include two RF modules 207. The multiple antenna reception apparatus 207 may include two RF modules 209. Each of the RF modules 203 and 209 may be constructed to select one of two antennas.

The adaptive modulation apparatus using the multiple antenna selection scheme may perform communication using a channel that consists of a combination of two antennas corresponding to a number of RF modules. Here, the number of combinations of antennas may correspond to the number of RF modules 203 of the multiple antenna transmission apparatus 201. The antenna combination may consist of a transmit antenna and a receive antenna with an optimal channel status among a plurality of antennas of the multiple antenna transmission apparatus 201 and the multiple antenna reception apparatus 207.

Since the adaptive modulation apparatus using the multiple antenna selection scheme supports the plurality of antennas in a single RF module through an antenna selection, it is possible to include a relatively fewer number of RF modules in comparison to the multiple antenna system including the same number of RF modules as the number of plurality of antennas. Therefore, the adaptive modulation apparatus using the multiple antenna selection scheme may adopt a fewer number of RF modules and thus manufacturing costs may be reduced.

Hereinafter, the multiple antenna transmission apparatus 101 and the multiple antenna reception apparatus 105 shown in FIG. 1 will be described.

Figure 3:
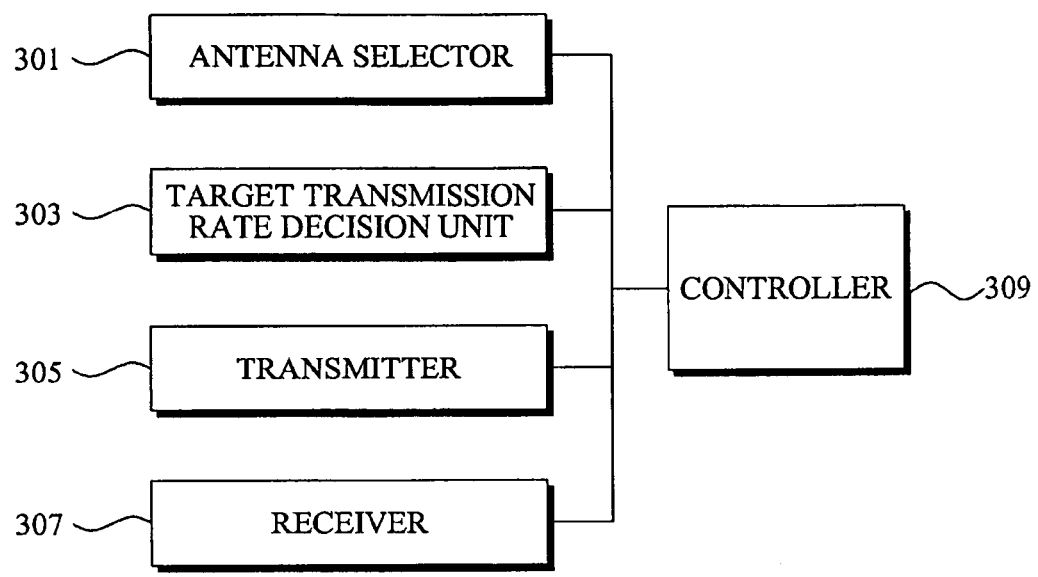
FIG. 3 is a block diagram for describing a multiple antenna transmission apparatus shown in FIG. 1.

FIG. 3 is a block diagram for describing the multiple antenna transmission apparatus 101 shown in FIG. 1

Referring to FIGS. 1 and 3, the multiple antenna transmission apparatus 101 includes an antenna selector 301, a target transmission rate decision unit 303, a transmitter 305, a receiver 307, and a controller 309.

The antenna selector 301 may select one transmit antenna from the plurality of transmit antennas 103. When the antenna selector 301 receives, from the multiple antenna reception apparatus 105, feedback information that includes at least one of an acceptance disallowing message of the target transmission rate and a transmit switched diversity request message, the antenna selector 301 may select another transmit antenna from the plurality of transmit antennas 103.

Specifically, the feedback information may include information regarding whether to accept the target transmission rate, a channel status value, a transmit switched diversity request, a number of transmit antennas, and the like. Also, a transmit switched diversity request message may include at least one of whether to switch the transmit antenna and an index of a transmit antenna with the largest channel status value.

Also, even when the feedback information is not received from the multiple antenna reception apparatus 105 for a predetermined period of time, the antenna selector 301 may select another transmit antenna from the plurality of transmit antennas 103.

The target transmission rate decision unit 303 may determine a target transmission rate of the selected transmit antenna. In this instance, the target transmission rate decision unit 303 may set the target transmission rate of the transmit antenna to a random target transmission rate or a maximum target transmission rate. Also, after the feedback information is received from the multiple antenna reception apparatus 105, the target transmission rate decision unit 303 may re-determine a final target transmission rate based on the channel status value of the received feedback information. In this instance, the re-determined final target transmission rate may be the same as or different from the initially determined target transmission rate.

Specifically, when the channel status value received from the multiple antenna reception apparatus 105 is high, the target transmission rate decision unit 303 may set the target transmission rate of the transmit antenna 20 to be high. Conversely, when the received channel status value is not high, the target transmission rate decision unit 303 may set the target transmission rate of the transmit antenna 20 to be low.

When the receiver 307 receives feedback information that includes an acceptance allowing message of the target transmission rate, the target transmission rate decision unit 303 may determine an optimal modulation type capable of satisfying the target transmission rate, based on the received channel status value. 1 to m modulation types may exist. Here, m is a natural number. The modulation type may be determined by comparing the received channel status value with thresholds TH1~THm that are set for each stage. In this instance, the thresholds set for each stage may be a reference value to reach a target transmission rate corresponding to each stage.

Specifically, when the received channel status value is between the thresholds TH1 and TH2 based on the thresholds TH1 to THm, the target transmission rate decision unit 303 may determine a first modulation type as the modulation type. When the received channel status value is between the thresholds TH2 and TH3, the target transmission rate decision unit 303 may determine a second modulation type as the modulation type. Also, when the received channel status value is greater than the threshold THm, the target transmission rate decision unit 303 may determine an $m^{th}$ modulation type as the modulation type. When the received channel status value is less than the threshold TH1, the target transmission rate decision unit 303 may determine the corresponding antenna is appropriate for the smooth communication and thereby select another transmit antenna via the antenna selector 301.

The transmitter 305 may transmit the determined target transmission rate to the multiple antenna reception apparatus 105. When the receiver 307 receives feedback information that includes an acceptance allowing message of the target transmission rate, the transmitter 305 may transmit data to the multiple antenna reception apparatus 105 using the received feedback information. Specifically, when the multiple antenna reception apparatus 105 accepts the target transmission rate, the transmitter 305 may transmit, to the multiple antenna reception apparatus 105, data that is modulated according to the determined modulation type and the final transmission rate based on the channel status value included in the feedback information.

However, when the receiver 307 receives feedback information that includes an acceptance disallowing message of the target transmission rate or a transmit switched diversity request message, the transmitter 305 may select another transmit antenna from the plurality of transmit antennas 103 and re-transmit the target transmission rate. Also, when a transmit switched diversity request message is received, the transmitter 305 may transmit a transmit switched diversity response message in response thereto. The transmit switched diversity response message may include an index of a transmit antenna that is switch reselected.

The receiver 307 may receive, from the multiple antenna reception apparatus 105, the transmitted feedback information that includes information regarding whether to accept the target transmission rate. Also, the receiver 307 may receive a response message with respect to the transmitted data according to the final transmission rate.

The controller 309 functions to completely control the multiple antenna transmission apparatus 101. Specifically, the controller 309 may control operations of the multiple antenna transmission apparatus 101 that includes the antenna selector 301, the target transmission rate decision unit 303, the transmitter 305, and the receiver 307.

Figure 4:
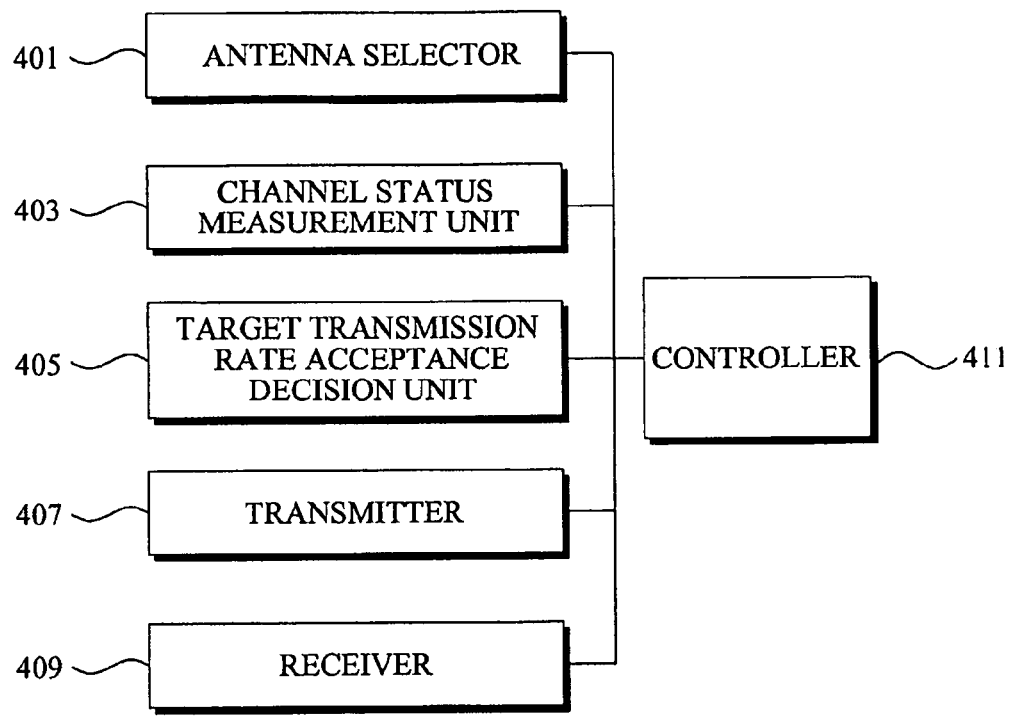
FIG. 4 is a block diagram for describing a multiple antenna reception apparatus shown in FIG. 1.

FIG. 4 is a block diagram for describing the multiple antenna reception apparatus 105 shown in FIG. 1.

Referring to FIGS. 1 and 4, the multiple antenna reception apparatus 105 includes an antenna selector 401, a channel status measurement unit 403, a target transmission rate acceptance decision unit 405, a receiver 407, a transmitter 409, and a controller 411.

The antenna selector 401 may select one receive antenna from the plurality of receive antennas 107. When the target transmission rate acceptance decision unit 405 determines it is impossible to accept the target transmission rate, the antenna selector 401 may select another receive antenna. Also, when a target transmission rate acceptance disallowing signal message is received from the target transmission rate acceptance decision unit 405, the antenna selector 401 may select a receive antenna with the best channel status value from a plurality of receive antenna channels by referring to a channel status storage unit (not shown).

The channel status measurement unit 403 may measure the channel status value of the receive antenna based on the target transmission rate received from the multiple antenna transmission apparatus 101 using the selected receive antenna. Every time the receive antenna is selected by the antenna selector 401, the channel status measurement unit 403 may measure the channel status value of the selected receive antenna and store a channel status value for each combination of transmit and receive antennas in the channel status storage unit.

The target transmission rate acceptance decision unit 405 may compare the measured channel status value with a predetermined threshold and determine whether to accept the target transmission rate received from the multiple antenna transmission apparatus 101. The predetermined threshold may be set for each stage in correspondence to the target transmission rate.

Specifically, the target transmission rate acceptance decision unit 405 may determine whether to accept the target transmission rate using the threshold set for each stage, according to the following two schemes.

In the first scheme, the target transmission rate acceptance decision unit 405 may select, as the predetermined threshold, a highest threshold among thresholds set for each stage. When the measured channel status value is greater than or equal to the selected highest threshold, the target transmission rate acceptance decision unit 405 may determine it is possible to accept the target transmission rate. For example, the target transmission rate acceptance decision unit 405 may select the highest threshold THm from the thresholds TH1 to THm and when the channel status value is greater than or equal to the selected threshold THm, may determine it is possible to accept the target transmission rate.

In the second scheme, the target transmission rate acceptance decision unit 405 may select, as the predetermined threshold, a threshold corresponding to the target transmission rate received from the multiple antenna transmission apparatus 101, from thresholds set for each stage. When the channel status value is greater than or equal to the selected threshold, the target transmission rate acceptance decision unit 405 may determine it is possible to accept the target transmission rate. For example, the target transmission rate acceptance decision unit 405 may select threshold $TH_{m-2}$ corresponding to the target transmission rate from the thresholds TH1 to THm. When the channel status value is greater than or equal to the threshold $TH_{m-2}$, the target transmission rate acceptance decision unit 405 may determine it is possible to accept the target transmission rate.

Every time the receive antenna is selected by the antenna selector 401, the target transmission rate acceptance decision unit 405 may determine whether to accept the target transmission rate with respect to the selected receive antenna. When it is possible to accept the target transmission rate with respect to all the receive antennas, the target transmission rate acceptance decision unit 405 may transfer, to the antenna selector 401, a transmission rate acceptance disallowing signal message with respect thereto.

The first scheme where the target transmission rate acceptance decision unit 405 determines whether to accept the target transmission rate based on the highest threshold may support the maximum transmission rate and thereby maximize the frequency efficiency.

The second scheme where the target transmission rate acceptance decision unit 405 determines whether to accept the target transmission rate based on the threshold corresponding to the target transmission rate may reduce a number of channel measurements and overhead in an antenna selection procedure and thereby minimize the antenna selection latency.

The receiver 407 may receive the target transmission rate from the multiple antenna transmission apparatus 101. Also, the receiver 407 may receive, from the multiple antenna transmission apparatus 101, data that is modulated based on feedback information.

The transmitter 409 may transmit, to the multiple antenna transmission apparatus 101, feedback information including information regarding whether to accept the target transmission rate. In this instance, when the target transmission rate acceptance decision unit 405 determines it is possible to accept the target transmission rate, the transmitter 409 may transmit feedback information including a target transmission rate acceptance allowing message. In this instance, the feedback information may include information regarding whether to accept the target transmission rate, a channel status value, a transmit switched diversity request, a number of transmit antennas, and the like. Also, a transmit switched diversity request message may include at least one of whether to switch the transmit antenna and an index of a transmit antenna with the largest channel status value.

Although it is impossible to accept the target transmission rate with respect to all the antennas, when a receive antenna with the best channel status value is selected from the plurality of receive antennas, the transmitter 409 may transmit, to the multiple antenna transmission apparatus 101, feedback information including a target transmission rate acceptance allowing message.

Conversely, when changing the transmit antenna, the transmitter 409 may transmit, to the multiple antenna transmission apparatus 101, feedback information that includes at least one of a target transmission rate acceptance disallowing message and a transmit switched diversity request message. Also, when the channel status value of the selected antenna is less than a lowest threshold among thresholds set for each stage, the transmitter 409 may not transmit feedback information.

The controller 411 functions to completely control the multiple antenna reception apparatus 105. Specifically, the controller 411 may control operations of the multiple antenna reception apparatus 105 that includes the antenna selector 401, the channel status measurement unit 403, the target transmission rate acceptance decision unit 405, the receiver 407, and the transmitter 409.

Figure 5:
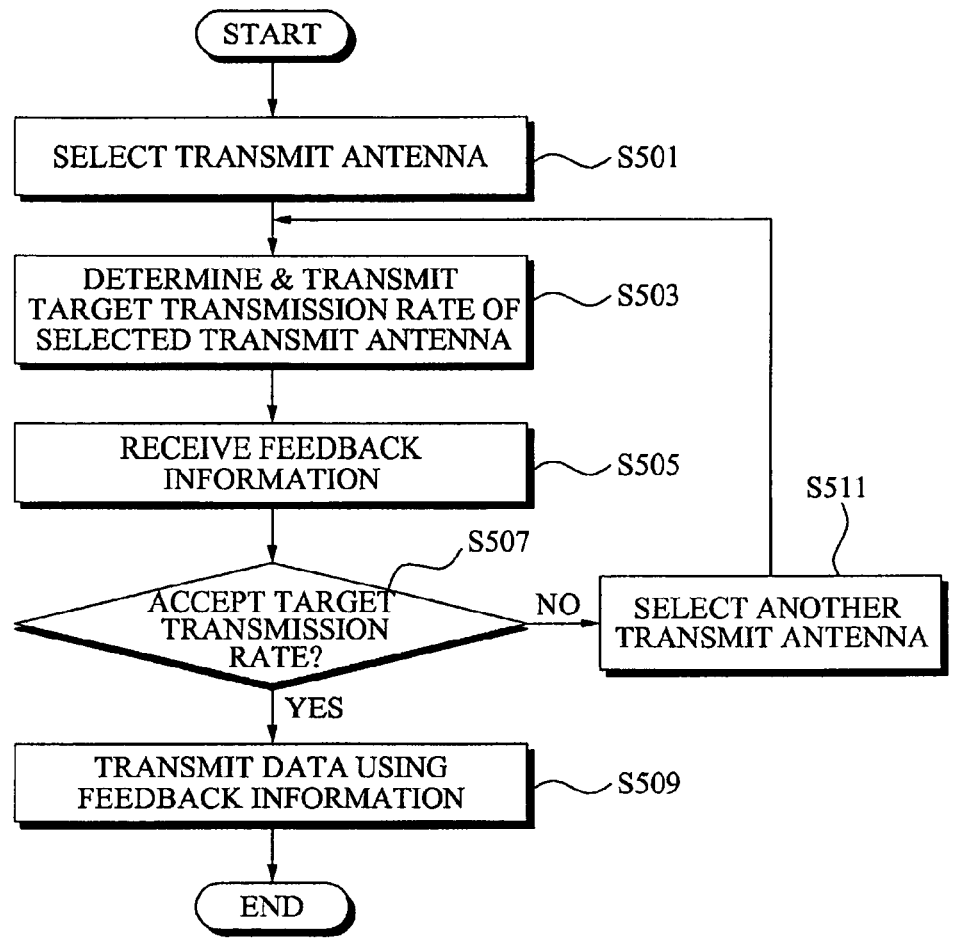
FIG. 5 is a flowchart illustrating a communication method of a multiple antenna transmission apparatus according to an embodiment of the present invention.

FIG. 5 is a flowchart illustrating a communication method of the multiple antenna transmission apparatus 101 according to an embodiment of the present invention.

Referring to FIGS. 1 and 5, the multiple antenna transmission apparatus 101 may select one transmit antenna from the plurality of transmit antennas 103 in operation S501.

In operation S503, the multiple antenna transmission apparatus 101 may determine a target transmission rate of the selected transmit antenna and then transmit the determined target transmission rate to the multiple antenna reception apparatus 105.

In this instance, the multiple antenna transmission apparatus 101 may set the target transmission rate of the transmit antenna to a random target transmission rate or a maximum target transmission rate.

In operation S505, the multiple antenna transmission apparatus 101 may receive, from the multiple-antenna reception apparatus 105, feedback information including information regarding whether to accept the target transmission rate.

Specifically, the feedback information may include information regarding whether to accept the target transmission rate, a channel status value, a transmit switched diversity request, a number of transmit antennas, and the like.

Next, when a transmit switched diversity request is received, the multiple antenna transmission apparatus 101 may transmit a transmit switched diversity response message.

When it is determined the multiple antenna reception apparatus 105 may accept the target transmission rate in operation S507, the multiple antenna transmission apparatus 101 may transmit data to the multiple antenna reception apparatus 105 using the received feedback information in operation S509.

Specifically, when the multiple antenna transmission apparatus 101 receives, from the multiple antenna reception apparatus 105, feedback information that includes a target transmission rate acceptance allowing message, the multiple antenna transmission apparatus 101 may compare the channel status value included in the feedback information with a threshold set for each stage to thereby determine a modulation type and a final target transmission rate. In this instance, the multiple antenna transmission apparatus 101 may determine the initially determined target transmission rate as the final target transmission rate, or may determine, as the final target transmission rate, a target transmission rate different from the initially determined target transmission rate.

Next, the multiple antenna transmission apparatus 101 may modulate the data according to the modulation type and transmit the modulated data to the multiple antenna reception apparatus 105 according to the final target transmission rate.

When the multiple antenna transmission apparatus 101 does not receive the feedback information for a predetermined period of time in operation S505, or when it is impossible to accept the target transmission rate in operation S507, the multiple antenna transmission apparatus 101 may select another transmit antenna from the plurality of transmit antennas 103 in operation S511. Also, even when the multiple antenna transmission apparatus 101 receives the feedback information that includes a transmit switched diversity request message, the multiple antenna transmission apparatus 101 may select another transmit antenna from the plurality of transmit antennas. Next, the multiple antenna transmission apparatus 101 may repeat operations 5503, S505, and 5507 with respect to the re-selected transmit antenna to thereby select an antenna for an optimal path. Also, the multiple antenna transmission apparatus 101 may transmit and receive the adaptively modulated data according to a path status and thereby maximize the frequency efficiency.

According to an aspect of the present invention, when transmitting and receiving data via an antenna supporting the target transmission rate, the multiple antenna transmission apparatus 101 may periodically receive the channel status value. When the channel status value is less than a lowest threshold among thresholds set for each stage, the multiple antenna transmission apparatus 101 may regard it as a communication fault and then transmit and receive the data via another transmit antenna. Therefore, although the usage path status is not good due to a fault and the like, the multiple antenna transmission apparatus 101 may select another antenna and smoothly perform communication via another path.

Figure 6:
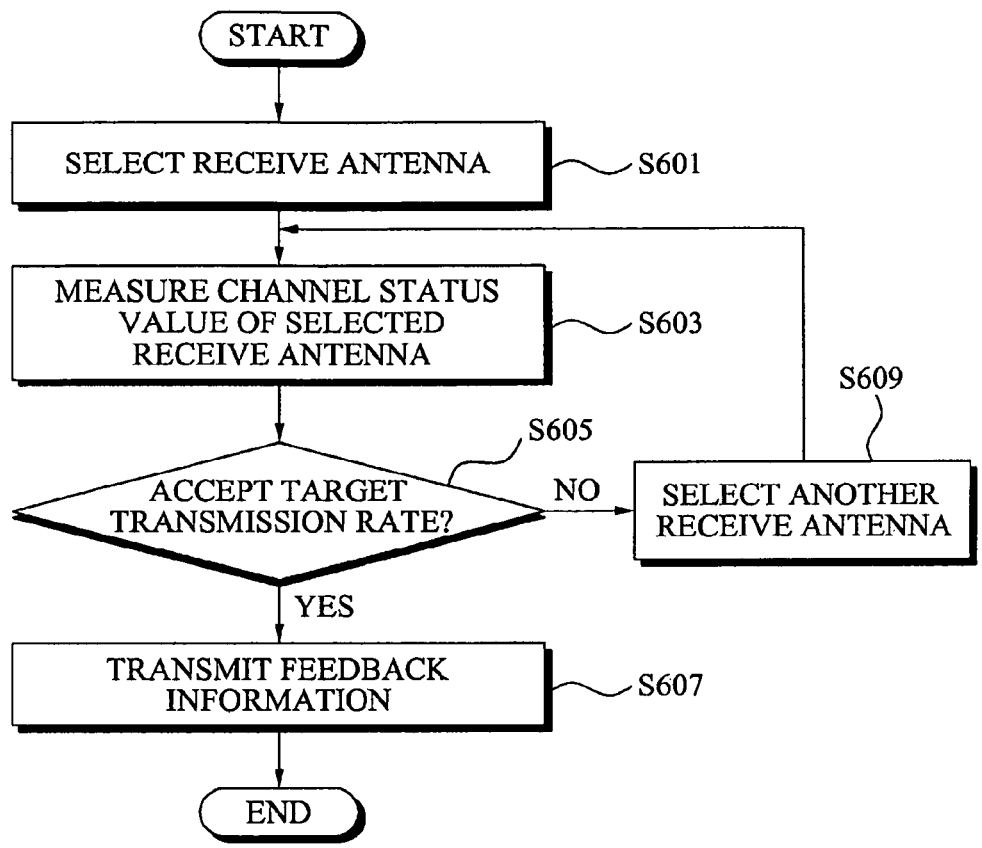
FIG. 6 is a flowchart illustrating a communication method of a multiple antenna reception apparatus according to an embodiment of the present invention.

FIG. 6 is a flowchart illustrating a communication method of the multiple antenna reception apparatus 105 according to an embodiment of the present invention.

Referring to FIGS. 1 and 6, the multiple antenna reception apparatus 105 may select one receive antenna from the plurality of receive antennas 107 in operation S601.

In operation S603, the multiple antenna reception apparatus 105 may measure a channel status value of the selected receive antenna.

Next, the multiple antenna reception apparatus 105 may measure the measured channel status value in a channel status storage unit for use as a reference when selecting an antenna.

In operation S605, the multiple antenna reception apparatus 105 may determine whether to accept the target transmission rate received from the multiple antenna transmission apparatus 101.

Specifically, the multiple antenna reception apparatus 105 may select, as the predetermined threshold, a highest threshold from thresholds set for each stage, and when the channel status value is greater than or equal to the selected highest threshold, determine it is possible to accept the target transmission rate.

Also, the multiple antenna reception apparatus 105 may select, as the predetermined threshold, a threshold corresponding to the target transmission rate among thresholds set for each stage, and when the channel status value is greater than or equal to the selected threshold, determine it is possible to accept the target transmission rate.

In operation S607, the multiple antenna reception apparatus 105 may transmit, to the multiple antenna transmission apparatus 101, feedback information including information regarding whether to accept the target transmission rate.

Specifically, when it is determined it is possible to accept the target transmission rate, the multiple antenna reception apparatus 105 may transmit, to the multiple antenna transmission apparatus 101, feedback information that includes a target transmission rate acceptance allowing message.

Conversely, when it is determined it is impossible to accept the target transmission rate in operation S605, the multiple antenna reception apparatus 105 may select another receive antenna from the plurality of receive antennas 107. Next, until the multiple antenna reception apparatus 105 selects an antenna capable of accepting the target transmission rate, the multiple antenna reception apparatus 105 may repeat operation S605 to thereby select an antenna for an optimal path and transmit and receive adaptively modulated data according to a path state. Through this, it is possible to maximize the frequency efficiency. Also, it is possible to minimize the antenna selection latency.

When it is determined it is impossible to accept the target transmission rate with respect to all the receive antennas, the multiple antenna reception apparatus 105 may select a receive antenna with the best channel status value from the plurality of receive antennas 107 by referring to the channel status storage unit. Even in this case, the multiple antenna reception apparatus 105 may transmit, to the multiple antenna transmission apparatus 101, feedback information that includes a target transmission rate acceptance allowing message.

Conversely, when the selected antenna or all the antennas cannot accept the target transmission rate, the multiple antenna reception apparatus 105 may transmit, to the multiple antenna transmission apparatus 101, feedback information that includes a target transmission rate acceptance disallowing message. Specifically, the feedback information may include information regarding whether to accept the target transmission rate, a channel status value, a transmit switched diversity request, a number of transmit antennas, and the like.

The multiple antenna reception apparatus 105 may request a switch of the transmit antenna by feeding back either the target transmission rate acceptance disallowing message or the transmit switched diversity request message.

When the channel status value of the selected antenna is less than a lowest threshold among thresholds set for each stage, the multiple antenna reception apparatus 105 may not transmit feedback information.

According to an aspect of the present invention, when transmitting and receiving data via an antenna supporting the target transmission rate, the multiple antenna reception apparatus 105 may periodically measure the channel status value in order to confirm the path state of an antenna and then transmit the measured channel status value to the multiple antenna transmission apparatus 101.

An adaptive modulation apparatus using a multiple antenna selection scheme according to an embodiment of the present invention may select an antenna in each of transmission and reception apparatuses, and adaptively modulate data according to a channel status of the selected antenna. Therefore, the adaptive modulation apparatus may select an optimal antenna and thereby making it possible to maximize the frequency efficiency and minimize the antenna selection latency.

Hereinafter, an adaptive modulation apparatus using an antenna selection scheme according to an embodiment of the present invention applied for a wireless communication standard will be described.

Figure 7:
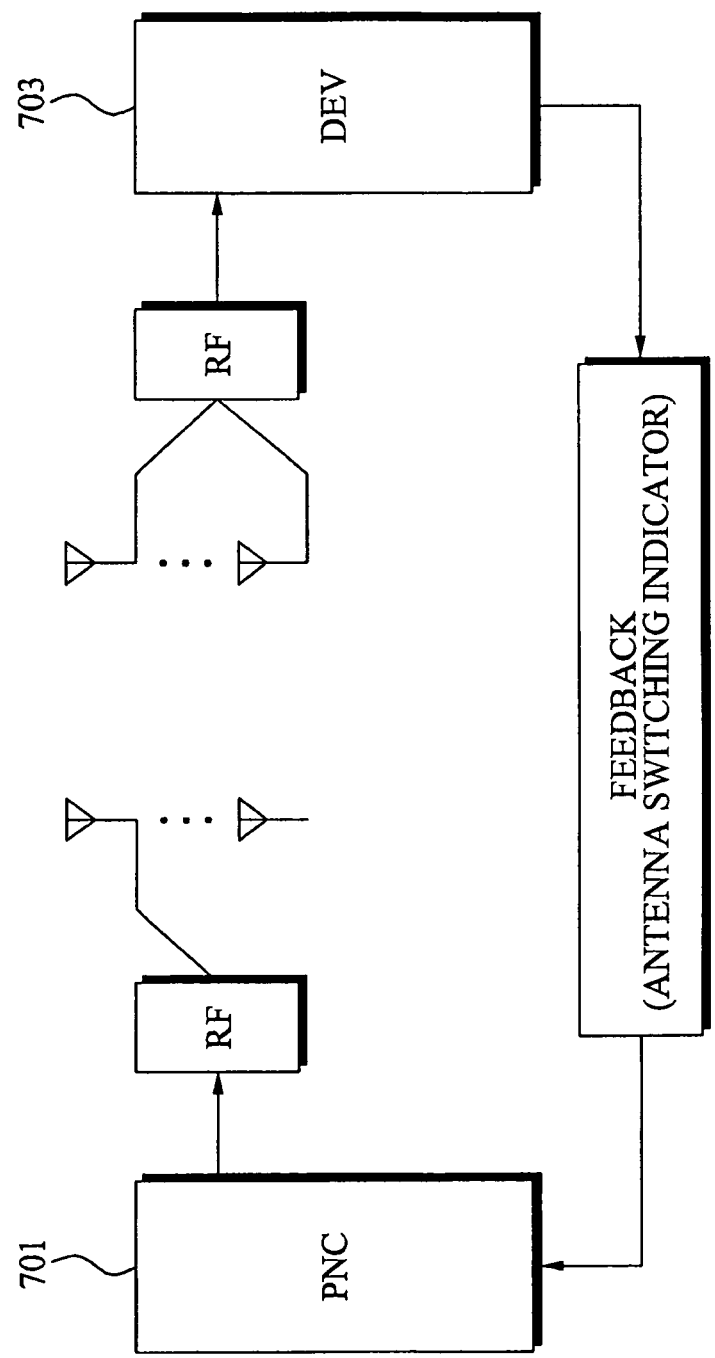
FIG. 7 is a block diagram illustrating a configuration of a multiple antenna communication system according to an embodiment of the present invention.

FIG. 7 is a block diagram illustrating a configuration of an adaptive modulation apparatus using an antenna selection scheme according to an embodiment of the present invention.

Referring to FIG. 7, the adaptive modulation apparatus includes a pan coordinator PNC 701 and a device DEV 703.

The pan coordinator PNC 701 and the device DEV 703 include multiple antennas that share a single common RF chain.

In this instance, the pan coordinator PNC 701 may select one antenna and transmit a frame via the selected antenna. The pan coordinator PNC 701 may receive switch information from the device DEV 703 via the selected antenna. Depending on the switch information, the pan coordinator PNC 701 may use the selected antenna, or may select another antenna and transmit the frame via the other antenna.

Every time the frame is received, the device DEV 703 may compare an SNR with a predetermined threshold to transmit the switch information. In this instance, if the SNR is greater than or equal to the threshold, the device DEV 703 may feed back "no-switch" information to the pan coordinator PNC 701. Conversely, if the SNR is less than the threshold, the device DEV 703 may feed back "switch" information to the pan coordinator PNC 701. If SNRs for all the antennas are less than the threshold, the device DEV 703 may select an antenna with a largest SNR and feed back an index of the selected antenna to the pan coordinator PNC 701.

Hereinafter, definition of primitives between a pan coordinator and a device will be described with reference to FIGS. 8 and 9. A transmit switched diversity may be applicable between the pan coordinator and the device and also may be used to achieve diversity gain from shadowing or blockage. The above process may be performed in a CAP section using a common rate.

Figure 9:
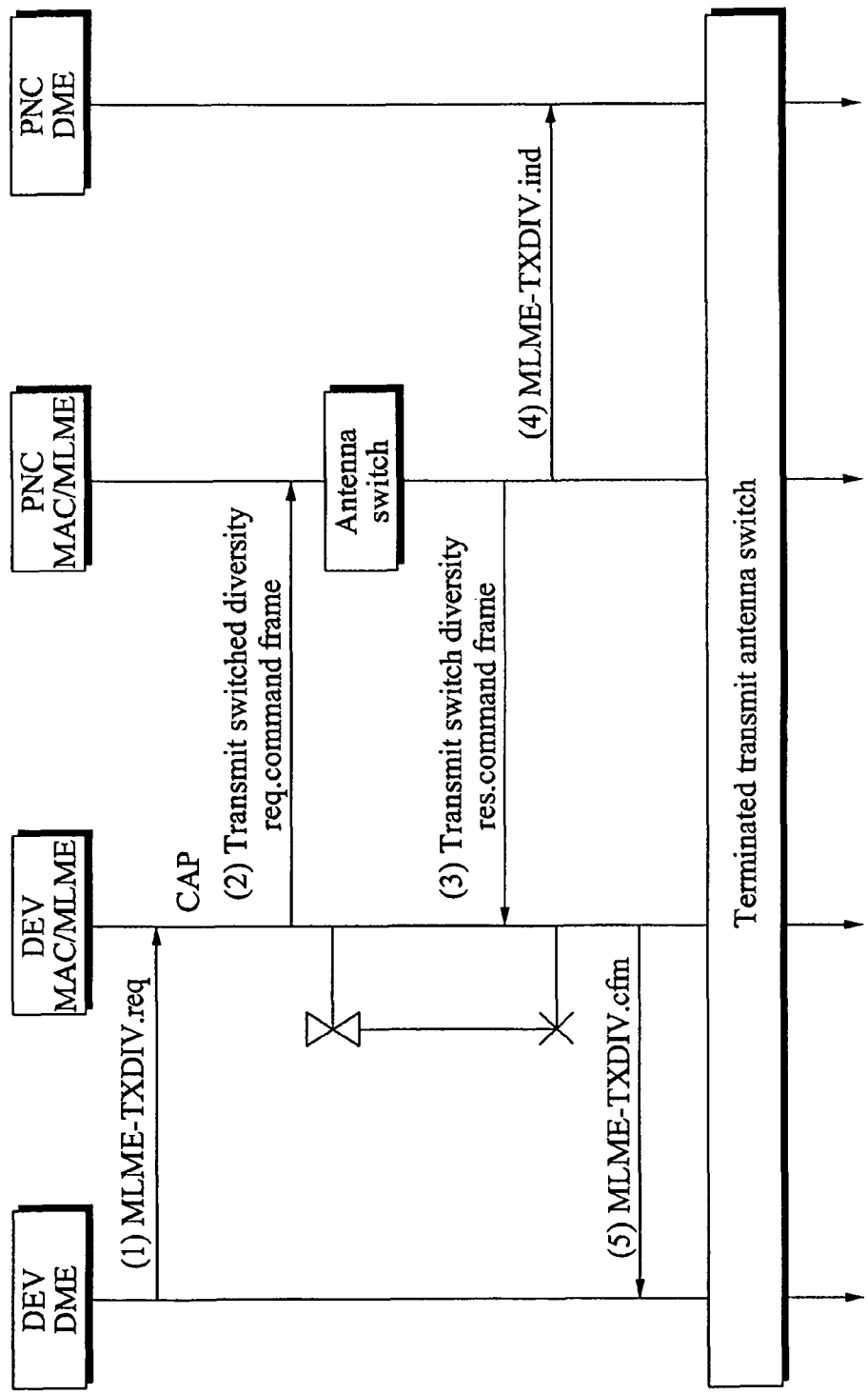

FIG. 8 illustrates parameters of primitives between the pan coordinator PAN 701 and the device DEV 703 shown in FIG. 7, and FIG. 9 illustrates a message sequence chart for the transmit switched diversity shown in FIG. 7.

Referring to FIGS. 8 and 9, MLME-TXDIV.request primitive is used to request for the transmit switched diversity as a Media Access Control (MAC) layer. The semantics of this primitive follow as:

```
MLME-TXDIV.request (
    TrgtID,
    TxDiversityTheshold,
    AntennaSwitchingStatus,
    Timeout,
)
```

MLME-TXDIV.confirm primitive is used to report the result for MLME-TXDIV.request primitive transferred from an upper layer to the upper layer. The semantics of this primitive follow as:

```
MLME-TXDIV.confirm (
    AntennaIndex,
    ResultCode,
    ReasonCode
)
```

MLME-TXDIV.indication primitive is used to inform a target device DEV of transmit switched diversity information. The semantics of this primitive follow as:

```
MLME-TXDIV.indication (
    OrigID,
    AntennaSwitchingStatus,
)
```

Hereinafter, a method of transmitting and receiving an inter-layer message between a pan coordinator PNC and a device DEV will be described. Once the device DEV receives a packet from the pan coordinator PNC, the device DEV first checks a received SNR and compares it with a predetermined threshold. According to the relationship between the received SNR and the threshold, the device DEV transmits MLME-TXDIV.request to DEV MAC/MLME.

Next, DEV MAC/MLME transfers a transmit switched diversity request command frame to PNC MAC/MLME. The pan coordinator PNC performs a switching operation according to information included in the received command frame.

Next, PNC MAC/MLME transmits, to DEV MAC/MLME, a transmit switched diversity response command frame containing the switching result.

Next, PNC MAC/MLME transmits, to PNC DME corresponding to an upper layer, MLME-TXDIV.indication including antenna index information.

The originating device DEV receives the transmit switched diversity response command frame and terminates a transmit switched diversity process according to the result included in the received frame.

Hereinafter, a format of a command frame and a transmit switched diversity information element (IE) will be described.

FIGS. 10 and 11 illustrate a transmit switched diversity IE added to an element identification (ID) of a wireless communication standard and a format of the IE.

A field for a number of transmit antennas denotes a total number of transmit antennas that is used to limit the number of transmit antennas switching in a pan coordinator PNC.

FIG. 12 shows a MAC command frame added to a wireless communication standard. The added MAC command frame includes transmit switched diversity request and response frames. The transmit switched diversity request command frame may be transmitted from a device DEV to a pan coordinator PNC when requesting the pan coordinator to switch its transmit antenna to another.

FIG. 13 illustrates a format of the transmit switch diversity request command frame shown in FIG. 12. The frame includes a switching status field, a length field, and a command type field. The switching status field may be formatted as shown in FIG. 14, and the command type format is defined in FIG. 12 and may be a command type value corresponding to a transmit switched diversity request.

Referring to FIG. 14, the switching status field includes an indication of antenna switching and a transmit antenna index. In this instance, the transmit antenna index field includes antenna index information, specifically, information associated with an index of antenna with the largest received SNR among antennas used until now in the current packet transmission.

FIG. 15 shows the format of the field for the indication of antenna switching. Referring to FIG. 15, the field for the indication of antenna switching includes information regarding whether the pan coordinator PNC should switch its transmit antenna or stay in the current transmit antenna, or jump to the transmit antenna which is indicated by the transmit antenna index field.

FIG. 16 shows the format of the transmit switched diversity response command frame shown in FIG. 12. Here, the transmit switched diversity response command frame includes a switched antenna index field, a length field, and a command type field as a response to the transmit switched diversity request command frame of the device DEV. The switched antenna index field denotes information associated with a transmit antenna that is newly selected by the pan coordinator PNC. The command type field is defined in FIG. 12 and may be a command type value corresponding to the transmit switched diversity response.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of operating a transmission apparatus, the method comprising:
   transmitting a target transmission rate to a reception apparatus;
   selecting one transmit antenna from a plurality of transmit antennas;
   transmitting data to the reception apparatus using the selected one transmit antenna;

receiving, from the reception apparatus, feedback information including an antenna switching information, wherein the antenna switching information is generated based on comparison between a channel status and a threshold corresponding to the target transmission rate at the reception apparatus; and selecting another transmit antenna from the plurality of transmit antennas, when the antenna switching information indicates a request to switch a transmit antenna.

2. The method of claim 1, wherein the antenna switching information is generated to indicate the request to switch the transmit antenna when the channel status value is smaller than the threshold corresponding to the target transmission rate.

3. A method of operating a reception apparatus, the method comprising:

receiving a target transmission rate from a transmission apparatus;

measuring a channel status based on data received from the transmission apparatus, wherein the data is transmitted by using one transmit antenna selected from a plurality of transmit antennas at the transmission apparatus;

determining a threshold corresponding to the target transmission rate;

comparing the channel status with the threshold; and transmitting, to the transmission apparatus, feedback information including a antenna switching information based on the comparison information.

4. The method of claim 3, wherein the transmitting comprises including the antenna switching information indicating a request to switch a transmit antenna into the feedback information, when the channel status is smaller than the threshold corresponding to the target transmission rate.

5. The method of claim 3, wherein another transmit antenna is selected among the plurality of transmit antennas at the transmission apparatus, when the antenna switching information indicates a request to switch a transmit antenna.

* * * * *